Patented Jan. 30, 1923.

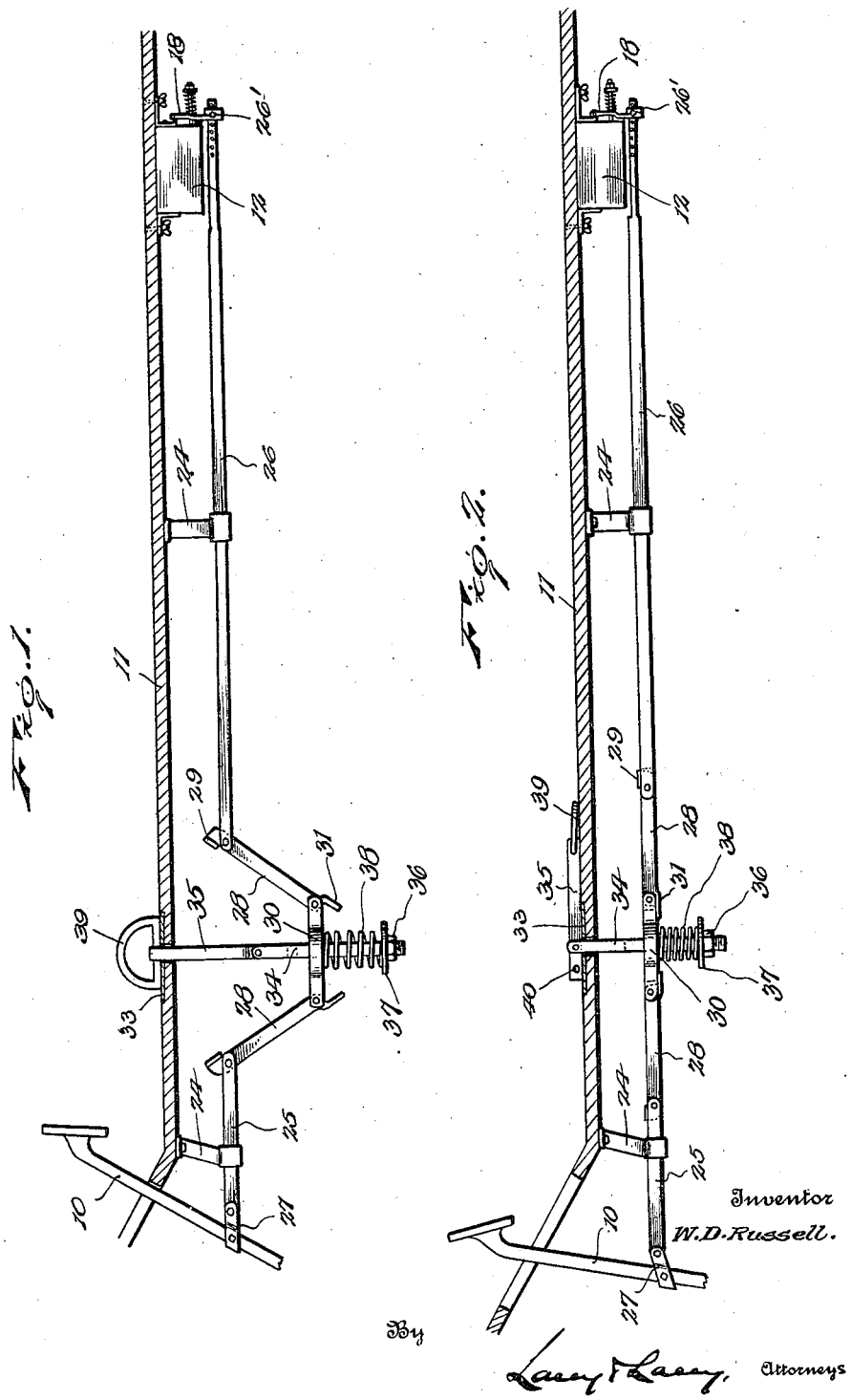

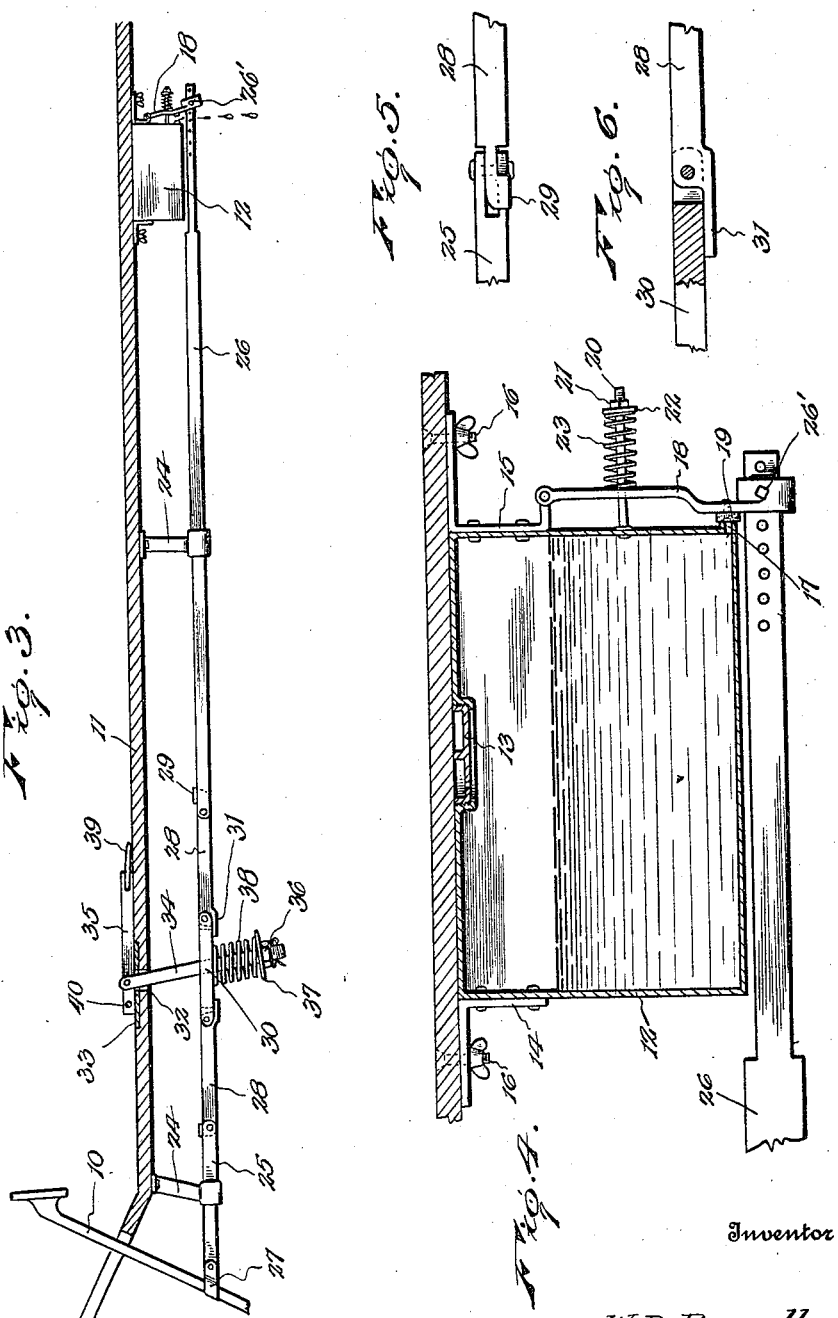

1,443,718

UNITED STATES PATENT OFFICE.

WILLIAM D. RUSSELL, OF TORRANCE, CALIFORNIA.

TRAIL MARKER FOR MOTOR VEHICLES.

Application filed October 22, 1921. Serial No. 509,615.

*To all whom it may concern:*

Be it known that I, WILLIAM D. RUSSELL, citizen of the United States, residing at Torrance, in the county of Los Angeles and State of California, have invented certain new and useful Improvements in Trail Markers for Motor Vehicles, of which the following is a specification.

This invention relates to an improved trail marker for motor vehicles and has as one of its principal objects to provide a device whereby, when a vehicle is stolen, a trail will be made indicating the course of the vehicle in being driven away.

A further object of the invention is to provide a device employing a container for a liquid of some distinctive color and wherein, when the vehicle is operated by some unauthorized person, a valve normally closing the container will be opened so as to permit liquid to drop from the container and thus make a trail indicating the course of the vehicle.

And the invention has as a still further object to provide a device which will normally be inoperative but wherein, when the owner leaves the vehicle, the device may be set for operation should the vehicle be stolen.

Other and incidental objects will appear hereinafter.

In the drawings:

Figure 1 is a side elevation showing my improved device before being set,

Figure 2 is a view similar to Figure 1, showing the device set,

Figure 3 is a view similar to Figure 2, showing the manner in which the device is adapted to make a trail.

Figure 4 is a sectional view showing the container of the device in detail,

Figure 5 is a plan view showing one of the joints of the device, and

Figure 6 is a side elevation showing another of the joints of the device.

The present invention is particularly designed for connection to one of the control pedals of a motor vehicle to be operated by said pedal and in the drawings, I have accordingly shown the device in conjunction with a motor vehicle clutch pedal 10, the floor of the vehicle being indicated at 11. In carrying the invention into effect, I employ a container 12 provided with a filling opening normally closed by a plug 13 and secured to the container are brackets 14 and 15 respectively. Extending through these brackets and through the floor 11 of the vehicle are bolts 16 firmly connecting the container with the vehicle floor. At its rear end the container is, as particularly shown in Figure 4, provided with a discharge opening 17 located near the bottom of the container and hinged upon the bracket 15 is a lever 18 to which is attached an appropriate valve 19 adapted to overlie the opening 17 closing said opening. Secured to the rear wall of the container to project freely through a suitable slot in the lever is a rearwardly directed rod 20 upon which is threaded a nut 21 retaining a washer 22 and bearing between said washer and the lever is a spring 23 surrounding the rod. As will be perceived, this spring will act against the lever for holding the valve 19 closed and, of course, the nut 21 may be adjusted for varying the tension of said spring. In connection with the lever, it is to be noted that said lever projects at its free end below the bottom of the container.

Secured to the floor 11 of the vehicle are alined brackets 24 and slidable through these brackets respectively are the sections 25 and 26 of a valve operating rod, the section 26 alining with the free end of the lever and being adjustably connected thereto by a bolt 26'. Pivotally connecting the section 25 at its forward end with the clutch pedal 10 is a clevis 27 and pivotally connected to the rear end of this section and to the forward end of the section 26 are toggle links 28. As particularly shown in Figure 5, the toggle links are provided at their adjacent ends with stop lugs 29 overhanging the sections 25 and 26 to coact therewith for limiting the links in their upward swinging movement with respect to the sections alining therewith. Extending between and connecting the toggle links is a coupling yoke 30. The links are pivotally connected to this yoke at opposite sides thereof and, as shown in Figure 6, are provided at their adjacent ends with stop lugs 31 extending beneath the yoke and adapted to coact therewith for limiting the sections in their movement with respect to the yoke alining therewith. Formed through the floor 11 of the vehicle above the yoke 30 is an opening 32 and secured to the floor to register with said opening is a wear plate 33. Extending freely through the plate and through said opening is a set rod which is formed of pivotally connected sections 34 and 35 respectively, the section 34 extending freely through the yoke 30. Threaded upon the lower end of said section is a nut 36 sustaining a washer 37 and bearing between said washer and the yoke is a spring 38 surrounding the rod, the nut being adjustable for tensioning said spring. Connected to the section 35 at its upper end is a hand loop 39 normally coacting with the plate 33 for suspending said rod from the floor of the vehicle.

In the normal operation of the vehicle, the sections 34 and 35 of the set rod will, as shown in Figure 1, be arranged to extend in alinement beneath the floor of the vehicle so that when the pedal 10 is shifted forwardly and released, incident to operation of the vehicle, the yoke 30 will be permitted to shift up and down the rod. However, when the owner leaves the vehicle, the hand loop 39 may be grasped and the set rod pulled upwardly through the floor 11 until, as shown in Figure 2, the upper section of said rod may be swung at right angles to the lower section thereof and arranged to coact with the floor for holding the yoke 30 elevated. In this position of the yoke, the lugs 31 of the links 28 will coact with the yoke at its lower side for holding the yoke against upward movement under the influence of the spring 38 while the lugs 29 of said links will coact with the adjacent ends of the sections 25 and 26 so that the spring will hold the yoke and said links under tension forming a rigid connection between the rod sections. In this elevated position of the yoke, the section 25 will be moved forwardly for holding the pedal 10 in a neutral or middle position. Accordingly, should some unauthorized person, during the owners absence, attempt to operate the vehicle, the pedal 10 will, upon being pushed forwardly and suddenly released, operate to move the rod sections rearwardly for opening the valve 19 so that the contents of the container will drip therefrom through the discharge opening 17. This container is preferably filled with a fluid of some distinctive color so that as the vehicle progresses, the fluid dripping on the ground or roadway will form a well defined trail marking the course of the vehicle. Thus, the course of the vehicle may be readily traced and the vehicle recovered. Formed through the rod section 35 near its inner end is an opening 40 through which an appropriate lock may be engaged for preventing said rod section from being shifted into alinement with the rod section 34. The device may thus be locked when set.

Having thus described the invention, what is claimed as new is:

1. A trail marking device for motor vehicles including a fluid container, a valve normally closing the container, a valve operating rod connected to a control element of the vehicle, and setting means for increasing the effective length of said rod whereby when said element is shifted the valve will be opened by the rod.

2. A trail marker for motor vehicles including a container, a valve normally closing the container, flexible means forming a connection between a control element of the vehicle and said valve, and setting means for shifting portions of the first means to increase the effective length of the first means whereby when said element is shifted the valve will be opened by the first means.

3. A trail marker for motor vehicles including a container, a valve normally closing the container, a rod operable by a control element of the vehicle for opening the valve and formed of pivotally connected sections, and setting means for shifting the rod sections to increase the effective length of the rod whereby when said element is shifted, the valve will be opened.

4. A trail marker for motor vehicles including a container, a valve normally closing the container, a rod operable by a control element of the vehicle for opening the valve, the rod being formed of sections, toggle links pivotally connected to said sections, and setting means for holding said links against pivotal movement whereby when said element is shifted the valve will be opened.

5. A trail marker for motor vehicles including a container, a valve normally closing the container, a rod operable by a control element of the vehicle for opening the valve, the rod being formed of sections, toggle links pivotally connected to the rod sections and movable into alinement therewith, means for limiting the links in alinement with the rod sections, and setting means for holding the links in alinement with the rod sections whereby when said element is shifted the valve will be opened.

6. A trail marker for motor vehicles including a container, a valve normally closing the container, a rod operable by a control element of the vehicle for opening the valve, the rod being formed of sections, toggle links pivotally connected to the rod sections and movable into alinement therewith, means for limiting the links in alinement with the rod sections, setting means for holding the links in alinement with the rod sections whereby when said element is shifted the valve will be opened, and yieldable means urging the links into alinement in the set position of said setting means.

7. A trail marker for motor vehicles including a container, a valve normally closing the container, a rod operable by a control element of the vehicle for opening the valve, the rod being formed of sections, toggle links pivotally connected to said sections and provided with lugs to coact with the sections for limiting the links in alinement with said sections, a yoke connecting said links, a setting rod slidable through said yoke and adapted to be set for holding the links in alinement with the rod sections whereby when said element is shifted the valve will be opened, and a spring carried by the rod to coact with the yoke for urging the links into alinement in the set position of the rod.

In testimony whereof I affix my signature.

WILLIAM D. RUSSELL. [L. S.]